(12) United States Patent
Elliott

(10) Patent No.: US 7,269,566 B2
(45) Date of Patent: Sep. 11, 2007

(54) METHOD FOR OBTAINING AND ALLOCATING INVESTMENT INCOME BASED ON THE CAPITALIZATION OF INTELLECTUAL PROPERTY

(75) Inventor: Douglas R. Elliott, St. Louis, MO (US)

(73) Assignee: TEQ Development, St. Louis, MO (US)

( * ) Notice: Subject to any disclaimer, the term of this patent is extended or adjusted under 35 U.S.C. 154(b) by 675 days.

(21) Appl. No.: 10/224,222

(22) Filed: Aug. 20, 2002

(65) Prior Publication Data

US 2003/0061064 A1    Mar. 27, 2003

Related U.S. Application Data

(62) Division of application No. 09/481,126, filed on Jan. 11, 2000.

(60) Provisional application No. 60/115,490, filed on Jan. 11, 1999, provisional application No. 60/161,178, filed on Oct. 22, 1999.

(51) Int. Cl.
    *G06Q 99/00* (2006.01)
(52) U.S. Cl. ............................................................ 705/1
(58) Field of Classification Search ................... 705/1
    See application file for complete search history.

(56) References Cited

U.S. PATENT DOCUMENTS

| | | |
|---|---|---|
| 5,126,936 A | 6/1992 | Champion et al. |
| 5,148,365 A | 9/1992 | Dembo |
| 5,193,056 A | 3/1993 | Boes |
| 5,530,520 A | 6/1996 | Clearwater |
| 5,608,620 A * | 3/1997 | Lundgren ...................... 705/1 |
| 5,644,726 A | 7/1997 | Oppenheimer |
| 5,680,305 A * | 10/1997 | Apgar, IV .................. 705/10 |
| 5,689,650 A | 11/1997 | McClelland et al. |
| 5,689,651 A | 11/1997 | Lozman |
| 5,704,045 A | 12/1997 | King et al. |
| 5,735,550 A | 4/1998 | Hinkle |
| 5,742,775 A | 4/1998 | King |
| 5,761,648 A | 6/1998 | Golden et al. |
| 5,774,883 A | 6/1998 | Andersenh |
| 5,802,501 A | 9/1998 | Graff |
| 5,806,047 A | 9/1998 | Hackel et al. |

(Continued)

FOREIGN PATENT DOCUMENTS

CA    2201429 A1 * 10/1998

(Continued)

OTHER PUBLICATIONS

Bertolotti, Nick, "Valuing intellectual property," Managing Intellectual Property, Feb. 1995.*

(Continued)

*Primary Examiner*—Jonathan Ouellette
(74) *Attorney, Agent, or Firm*—Storm LLP; Paul V. Storm; John J. Patti

(57) ABSTRACT

The present invention relates to methods of valuing property assets and methods of securitizing such assets. The present invention provides a means whereby holders or owners of proprietary intellectual property may readily determine the value to the business of the securitization of their intellectual property estate and obtain capital by securitizing all or part of their intellectual property estate.

7 Claims, 3 Drawing Sheets

U.S. PATENT DOCUMENTS

| | | | |
|---|---|---|---|
| 5,806,048 A | | 9/1998 | Kiron et al. |
| 5,812,988 A | | 9/1998 | Sandretto |
| 5,999,907 A | * | 12/1999 | Donner .......................... 705/1 |
| 6,018,714 A | * | 1/2000 | Risen et al. .................... 705/4 |
| 6,154,725 A | * | 11/2000 | Donner .......................... 705/1 |
| 6,175,824 B1 | * | 1/2001 | Breitzman et al. ......... 705/36 R |
| 6,263,314 B1 | * | 7/2001 | Donner .......................... 705/1 |
| 6,393,406 B1 | * | 5/2002 | Eder .............................. 705/7 |
| 6,556,992 B1 | * | 4/2003 | Barney et al. ................. 707/6 |
| 6,571,219 B1 | | 5/2003 | Spivey |

FOREIGN PATENT DOCUMENTS

| | | |
|---|---|---|
| EP | 0825544 A1 | 2/1998 |

OTHER PUBLICATIONS

Bertolotti, Nick, "Valuing Intellectual Property," Managing Intellectual Property. London: Feb. 1995, Iss. 46, p. 28, 5pgs.*

Parr, Russell, "Pricing Intangible Assets: Methods of Valuation of Intellectual Property," Seminar for the Valuation of Intellectual Property, Oct. 1998.*

Neil D.J., "The Valuation of Intellectual Property" International Journal of Technology Management, 1988, Switzerland, vol. 3, No. 1-2, pp. 31-42, XP 000900595.

Mansini R. et al., "Selection of Lease Contracts in an Asset-backed Securitization: A Real Case Analysis", Workshop on Decision Theory and Decision Support, Laxenburg, Austria, Feb. 25-27, 1998; vol. 28, No. 4 pp. 739-754, XP 000900694.

Dyan Machan, "An Edison for a New Age?", Forbes, May 17, 1999 pp. 178-182 and 184-185.

Jay Palmer, "Dell-phic Oracle" Michael Dell's vision: more internet, more access, more change; Barron's The Dow Jones Business and Financial Weekly, Jun. 21, 1999, pp. 33, 34 and 36.

Richard Binnis, et al., "Using IPR to Raise Debt Capital," Ies Nouvelles, Jun. 1999, pp. 78-80.

Thurm, Scott, "A Flood of Web Patents Stirs Dispute Over Tactics", The Wall Street Journal, Oct. 9, 1998, pp. B1, B4.

Fremgen, James M., Accounting for Managerial Analysis, 1972, pp. 388-399, Richard D. Irwin, Inc., Homewood, IL, USA.

"Industry Trends in Research Support and Links to Public Research" Jun. 25, 1998, National Science Board.

Graef, Jean, "Measuring Intellectual Assets", Montague Institute Review, Mar. 1997.

Bowen, Ted Smalley, "Aurigin Application Helps Users Get a Grip on Intellectual Assets", 1998, InfoWorld Publishing Co., San Mateo, CA.

Bingaman, Anne, "Antitrust, Innovation and Intellectual Property", presented to the Program on Antitrust & Intellectual Property, Oct. 7, 1994, Stanford Law School, Stanford, CA.

Standard Federal Tax Reports, Section 174, Research Expenditures; Commerce Clearing House, Inc., 1997.

Klein, Joel I., "Cross-Licensing and Antitrust Law" presented to the American Intellectual Property Law Association on May 2, 1997, San Antonio, Tx, pp. 4-5.

Carney, Robert T. and McGavock, Daniel M., "Tax Strategies for Protecting Value of IP", Ies Nouvelles, Mar. 1997, pp. 21-22.

Solt, Michael E., "SWORD Financing of Innovation in the Biotechnology Industry", Financial Management, Summer 1993, v22 n 2, p. 173.

"Managing, Valuing and Protecting Intellectual Assets", Report No. 1182-97-CH, 1997, The Conference Board.

McGavock, Daniel M., and Lasinski, Michael J., "IP Survey Finds Gap in Information", Ies Nouvelles, Sep. 1998, p. 113.

"Industry Trends in Research Support and Links to Public Research" Jun. 25, 1998, National Science Board.

Trade Regulation Reports, Sections 5080, 5085 & 5100, Patents, Trademarks, Copyrights; Commerce Clearing House, Inc. 1989.

Orleans, G.P., "Pricing Technology Licensing", 1982 Licensing Law Handbook, Ch. 2, pp. 119-131, Clark Boardman Co., Ltd., New York, NY.

"Antitrust Guidelines for the Licensing of Intellectual Property" Apr. 6, 1995, U.S. Department of Justice & the Federal Trade Commission.

Moody's Investors Service, "S3 Inc.—History & Debt", Nov. 28, 1998, pp. 1-3.

Reedy "Poof Alternatives: Consolidation strategies in today's environment", Houston Business Journal, Nov. 23, 1998.

Reilly et al., "The Valuation of Health Care Intangible Assets", Health Care Management Review, Gaithersburg, Spring 1997, vol. 22, Iss. 2; p. 55 (10 pgs.).

Gordon et al., 2nd Ed. (1994) and 3rd Ed. (2000) "Valuation of Intellectual Property and Intangible.Assets", 16pgs total.

Reilly, "The Valuation of Proprietary Technology", Management Accounting, Montvale, vol. 79, Iss. 7, p. 45, 5 pgs. (8 pages total).

Kieso et al., "Intermediate Accounting", John Wiley & Sons, Inc., 8th Ed., 1995, pp. 571-619; ISBN 0-471-59759-7 (total pgs. 49).

* cited by examiner

METHOD FOR OBTAINING AND ALLOCATING INVESTMENT INCOME BASED ON THE CAPITALIZATION OF INTELLECTUAL PROPERTY

The present invention relates to methods of valuing assets and methods of securitizing such assets. In particular, the present invention relates to methods of valuing and securitizing intellectual property. This is a divisional application of application 09/481,126, filed on Jan. 11, 2000 which claims priority to Provisional patent application No. 60/115,490 filed on Jan. 11, 1999 and Provisional Patent application No. 60/161,178 filed on Oct. 22, 1999.

BACKGROUND OF THE INVENTION

An object of financial transactions is to efficiently relate the valuation and risk of property created in the course of an enterprise to monetary sums which may be paid for or advanced against such property. A primary purpose for such transactions is the increase in capital which may be employed to perpetuate further useful enterprises. Two requirements of financial transactions are: (a) a means by which providers of capital may reasonably determine whether to enter into particular financial transactions with holders of property, and (b) a means for effecting the exchange of capital and property, respectively.

Various computational means exist that constitute prior art for measuring the reasonable market value of financial transactions involving properties owned by an enterprise. In the case of tangible properties and real estate, a principal element of the means has been the existence of a marketplace wherein the payment or advancement of monetary sums for similar properties occurs regularly, is recorded and published, and information is consequently available to participants in other such transactions. This permits a quantification of material terms and conditions for a specific financial transaction based on its similarity or, alternatively, its dissimilarity to prior financial transactions which occurred in a specific marketplace. For example, real estate is often purchased using money borrowed in the form of a mortgage. The lender provides the capital to acquire the property from its current owner in exchange for agreed upon future payments and a security interest in the property. Often, the original lender sells its mortgage rights to a third party for an amount based on the estimated present value of the future payments which the purchaser agrees to make. Similarly, one who owns real estate may obtain capital by selling the real estate to a lender and leasing back the property on specific terms. Both mortgages and/or sale/lease back agreements have been packaged and re-sold to third parties as securities. The process by which such a security is created is referred to as securitization.

The essential elements of such transactions that permit securitization are an assignable agreement having one or more specified future payments backed by rights sufficient to assure the party purchasing the security that the payments will be made or title to property of similar value can be obtained. In the case of a mortgage, the property interest is title to real estate. In the case of a sale/lease back, the property interest is the right of eviction. In the case of the securitization of patents, discussed in more detail below, the property interest obtained in the event that the future payments are not made is the right to exclude others from the use of the invention. In each case, the party providing the capital has the ability to acquire a property interest that can be resold to others to provide a return on their original capital investment in the event that the specified future payments are not made according to the agreement.

An increasingly significant object and result of human enterprise is the creation of new and useful knowledge through scientific inquiry and experimentation. Such activities are otherwise known as research and development (hereinafter "R&D"). Between the years 1981 and 1996 various public and private enterprises of the United States expended in the aggregate a sum varying between 2.32% and 2.74% of the annual Gross Domestic Product on R&D. In the calendar year 1995, aggregate U.S. R&D expenditures were computed to be in excess of $183 Billion. A result of R&D expenditures has been the creation of useful and proprietary discoveries which is generally called intellectual property. In the practice of accounting, it is well established that intellectual property is "intangible property" which is distinguishable from "tangible property" such as real estate, equipment, business inventories and the like.

As an incentive for R&D expenditures, R&D costs are fully deductible as an expense in the year the costs are incurred. Therefore, when R&D expenditures result in intellectual property such as a patent, the "book value" of the patent is zero even though the value to the business may be large. The market value of intellectual property is rarely evaluated because it is rarely sold or otherwise conveyed. This is so because the more valuable an intellectual property is, the more likely it is to be used by the business that developed it and the less likely it is to be sold. Thus there can exist a substantial difference between the market value of intellectual property and its book value. This difference represents an unrecognized capital asset of many businesses.

Heretofore, the apparently inalienable nature of intangible property has been an impediment to the securitization of such assets. This intangible quality of intellectual property has frustrated development of financial transactions to capitalize the inherent value of intellectual property. Although, patents and other intellectual property have been sold for capital and security interests in intellectual properties and have been used in the past to obtain capital, no generalized market for such properties has developed. One reason for this is that methods for determining the value to the business of intellectual property have not been made readily available to financial managers. Therefore, expenditures on R&D have tended to consume capital resources of an enterprise due to the unavailability of straightforward securitization for any resulting intellectual properties.

Some intellectual properties, created as a consequence of R&D, possess desirable characteristics which lend themselves to securitization. Patents are one such intellectual property. Patents entitle the owner to exclude others from practicing the invention covered by the patent. Another type of intellectual property is information described in writings and knowledge arising within a business which is: (a) not generally known by others; (b) is retained in secret, and (c) is disclosed to others only under covenants to retain such disclosed intellectual properties secret between and among the parties bound by such covenants (referred to as "trade secrets" or "know how"). Copyrights are another form of intellectual property which may be securitized.

A characteristic of these intellectual properties is the opportunity afforded to the owners or holders of such intellectual properties to license, lease or otherwise convey rights to use or otherwise practice the useful art, in whole or in part, embodied in such intellectual properties (hereinafter referred to as "licensing").

The securitization of these intellectual properties has not widely occurred due to the lack of a readily available method for determining the value to a business of the securitization of some or all of its intellectual property and the lack of a marketplace for securities related to intellectual properties. Additional obstacles to the securitization of intellectual properties has been that prior transactions have either not constituted a sale subject to the favorable tax treatments associated with a sale. Other prior transactions have involved a sale and license arrangement where future payments are related to future sales of the goods or services covered by the intellectual property. In such a transaction, the future payments are not fixed or readily predictable. Therefore, the current value at any given time of such an agreement is difficult to quantify without substantial analytical effort.

An object of the present invention is to provide a means whereby holders or owners of proprietary intellectual property may readily determine the value to the business of the securitization of their intellectual property estate and obtain capital by securitizing all or part of their intellectual property estate. A further object of the invention is to provide a method of securitizing intellectual property that can have the tax treatment of a sale and has predictable future payments which permits ready valuation of the current value of the security at any time during the life of the agreement. A further object of the present invention is to provide a means to relate the valuations and risks associated with different proprietary IP's to each other and to other securitized financial transactions. A still further object of the present invention is to provide a means by which providers of capital may aggregate and convey capital, and holders of proprietary IP may aggregate and convey proprietary IP in exchange for said capital. The aforementioned means shall also provide for the allocation of and accounting for equitable interests, income, and liabilities by and among the respective parties. Collectively, the means contemplated by the present invention are embodied in certain novel software, flowcharts and computational algorithms which separately and collectively constitute the devices and utilities to accomplish the aforementioned objects of the present invention. Another novelty disclosed by this invention is the securitization of proprietary IP through the concurrent or sequential exchange of rights in possession with rights in use which appends to the underlying financial transaction. A still further novelty disclosed by this invention is the creation of a legal entity required to hold the entire interests of the investors' rights in conveyed intellectual properties to perfect and enforce such rights.

GENERAL DESCRIPTION OF THE INVENTION

The essential elements of the method of securitizing a patent include transferring title to one or more patents from the initial owner to a subsequent owner and the grant back to the initial owner of a license which has a scope less than the entire exclusive right of the patent and which requires one or more fixed future payments, which payments can be assigned to third parties by the subsequent owner. The scope of the license may be a nonexclusive license which permits additional licensing by the subsequent owner. Alternatively, the license granted to the initial owner may be an exclusive license limited to a field of use less than the entire scope of the patents involved in the transaction.

The invention Includes a Unique Method of Securtizing a Patent.

To securitize a patent or other intellectual property, the entity acquiring the patent must truly become the owner of the patent so that the favorable tax treatment associated with the sale of a capital asset can be achieved. Further, the acquiring entity must obtain investment capital using recognized financial transactions. Therefore, the method of securitizing a patent described herein includes related but separate financial transactions, one of which is the true transfer of title to one or more patents and the other is in the form of an assignable investment instrument, including a system of obtaining payments from the former patent holder and allocating payments to one or more investors. The invention is discussed in more detail below with respect to an owner of a single patent. Nevertheless, the methods disclosed herein are applicable to a portfolio of multiple patents and to other types of intellectual property, as well.

The method comprises a method of allocating payments to each respective one of at least one investor account including the steps of: (a) defining at least one investor account, (b) obtaining an initial amount from at least one investor in exchange for an assignable agreement to allocate a proportionate amount of future income to the investor(s), (c) associating said initial amount from the investor(s) with the investor(s)'s account(s), (d) identifying the initial owner of a patent, (e) paying an amount to said initial owner of said patent upon the transfer of title to said patent from said initial owner to a subsequent owner other than one of the investor(s), (f) granting a license to said initial user for the use of the invention covered by the patent from said subsequent owner in exchange for an agreement by said initial owner to make at least one payment in a predetermined amount at a specified time, wherein said at least one payment may be assigned by said subsequent owner to a third party, (g) said license being limited in scope to include less than the entire exclusive right conferred by the patent, (h) obtaining at least one payment from said initial owner of said patent, (i) allocating said at least one payment from said initial ownership to the respective investor account(s), (j) wherein each investor(s) may assign their right to receive payment to a subsequent investor.

The method may also be applied in the situation where a particular patent is already licensed to a user other than the owner. In such case, the patent may be acquired from the current owner, subject to the existing license obligation, so long as the existing license is consistent with the method disclosed herein. Alternatively, the method may be applied independently of such license so long as the license back to the initial owner is broad enough to encompass the existing license. Thus, the method would not be directly applicable in the situation where a patent owner had granted an exclusive license of all the rights granted by the patent unless the licensee also participated and agreed to enter a new license in accordance with the method disclosed herein.

Although the method can be applied in the situation where there is only one investor, a much more typical situation will involve multiple investors. In that situation, each investor has a separate account and can separately sell their interest to subsequent investors and the system must create and track multiple investor accounts.

The Invention Includes a Method of Determining a Change in Value of an Owner of a Patent.

To effectively securitize a patent, an economically reasonable estimate of the current value of the patent must be obtained. Further, the ability to demonstrate to the current owner the value to them of securitizing their patent(s) is useful. While numerous methods of estimating the value of one or more patents are known, the invention disclosed herein includes a method of combining an estimate of the value of a patent with an assessment of the impact on the value of the business of securitizing that patent. This method comprises entering information related to the patent estate, calculating a value of the patent estate using a first valuation algorithm, selecting a second valuation algorithm having a plurality of inputs, inputting the value of the patent estate into the second valuation algorithm, inputting at least one additional piece of information required by the second valuation algorithm, and calculating the change in value of the owner of the patent using the second valuation algorithm. The method further comprises: inputing an identifier indicative of a utility of the patent by selecting from a list comprising "new product category," "improvement on an existing product," "a new process," "an improvement on an existing process," and "regulatory compliance." The method may further comprise: selecting a first valuation algorithm from a plurality of valuation algorithms by selecting a first valuation algorithm particular to the type of utility associated with the patent. The method further comprises entering information on the financial characteristics of the owner not directly related to the patent. The owner's return on equity is an example of such a financial characteristic.

Method of Calculating the Change in Value of an Owner of Intellectual Property Upon Entering a Securitizing Agreement.

The present invention is a method to determine the securitizable value of a patent estate and whether the owner of the estate will be benefited by securitizing the patent estate. The method also applies to other types of intellectual property such as copyrights and trade secrets. For purposes of simplicity, the following discussion will use a patent estate for illustrative purposes.

Identifying a Patent Estate.

In order to begin the process, a patent estate must be identified. Generally, a business is identified that is interested in securitizing their patent portfolio. The business will identify all patents which they own and which they wish included in the patent estate being analyzed. A patent estate for the purposes of this invention may be a single patent or group of patents but would generally consist of all the patents owned by the business that relate to a particular product line or business activity. The patent estate may also contain patents owned by third parties so long as the business has exclusive rights in such third parties patents and the right to convey such exclusive rights to others. Once the patent estate is specifically identified, for the purposes of the method, the patent estate is given an identifier for tracking purposes.

Entering Information Related to the Patent Estate.

Once the patent estate is identified, its current value must be determined to an acceptable degree of accuracy for purposes of securitization. Different methods of valuing patents exist and will produce different estimated values. Typical information used for this valuation include, but are not limited to, sales of the goods covered by the patent, cost savings attributable to the invention covered by the patent, the book value of the business activities associated with the patent and ongoing expenditures for research and development. The number of different approaches to determining value of the patent estate is virtually limitless. See, for example, 1982 Licensing Law Handbook published by Clark Boardman Co.

When determining securitizable value, it is particularly appropriate to include methodologies that account for ongoing revenues and costs. Patents not associated with any revenue are unlikely to have a reasonably predictable security value. Further, some patents have the benefit of reducing costs and reduced costs must be considered for such patents. Some patents, such as those associated with environmental control technologies, provide the benefit of permitting a business to continue in operation and therefore ongoing revenue is preserved.

The particular valuation algorithm will necessarily determine what information must be obtained and entered for the valuation to be completed. In addition to financial information, additional information such as the remaining life of the patent or a description of the benefit provided may be used by the first valuation algorithm.

Determining a Value of the Patent Estate Using a First Valuation Algorithm.

Once the first valuation algorithm has been determined, the current value of the patent estate is determined using the algorithm.

Selecting a Second Valuation Algorithm Having at Least Two Inputs.

Determining whether a particular business should securitize a particular patent estate will depend on factors in addition to the estimated value of the patent estate. In particular, it will rarely be beneficial to securitize a patent estate, which requires a future payment stream predicated on a return on investment to the securitizing party greater than the business's return on equity. Therefore, in addition to determining the current value of the patent estate, the change in value of the owner of the patent estate must be determined. It is presumed that a patent owner would not securitize its patent estate if it resulted in a drop in the value of the business.

Entering the Value of the Patent Estate into the Second Valuation Algorithm.

Although not dispositive, the current value of the patent estate is presumed to be the value at which the estate will be securitized, assuming a decision to securitize is made and therefore the estimated current value is a critical piece of information used by a second valuation algorithm. Once the change in value of the business based on this assumption has been determined, the patent estate may be securitized for an amount related to, but not identical to, the estimated current value. For example, if the estimated current value is $370,180,000, the patent estate may be securitized for $350,000,000, $370,000,000 or other amounts in a similar range but would not be expected to be securitized for an amount of $500,000,000.

Securitization will typically involve an exchange of the patent estate for a lump sum payment and an agreement to make future royalty payments. The future value to the business of the net proceeds of the lump sum amount must be considered in any second valuation algorithm. One measure of the future value of the net proceeds of the lump sum payment is the businesses current return on equity. Other measures such as money market rates or the prime rate may also by used.

Securitization may also involve an agreed upon future payment stream from the securitizing party to the business.

Entering Additional Information Required by the Second Valuation Algorithm.

Once the second valuation algorithm is selected, the appropriate information is collected and entered.

Using the Second Valuation Algorithm to Determine a Change in the Current Value of the Owner of the Patent.

The second valuation algorithm will determine the value of the business assuming the patent estate is securitized and presuming that the patent estate is not securitized. The difference between the two values is the net value of the decision to securitize the patent estate. If the value is positive, the business will be better off in the amount if the patent estate is securitized in accordance with the assumptions of the method.

The method of Establishing a Marketplace for Securitized Intellectual Property.

To permit the management of a portfolio of securitized patents with the ability to include new investors and permit existing investors to transfer their interests, a computer system is necessary. The system will handle multiple patent portfolios, multiple investor accounts and the transactions whereby interests in the various patent portfolios are transferred between investors.

DESCRIPTION OF THE PREFERRED EMBODIMENT

Figure 1:
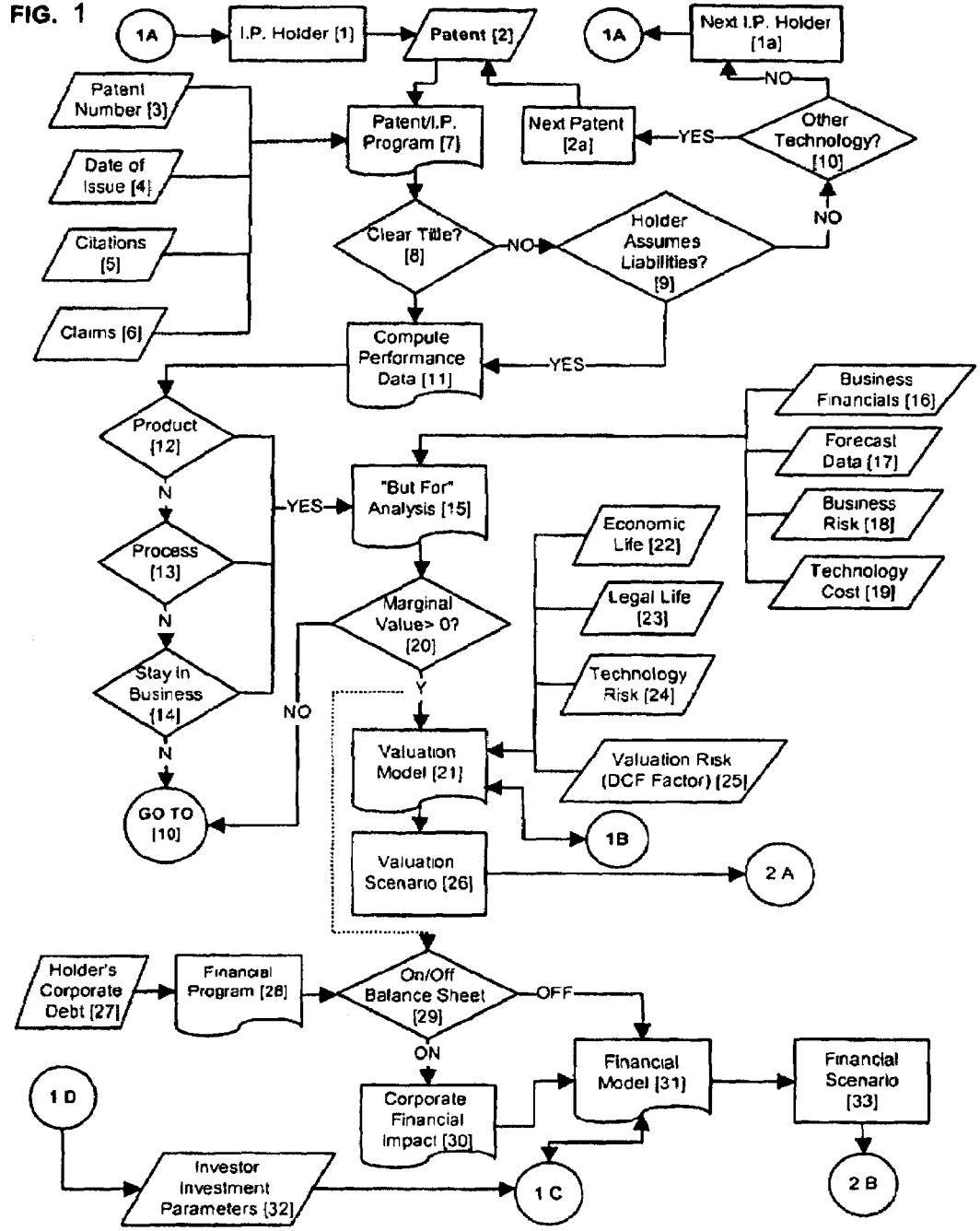
FIG. 1 is a general flowchart view of the portions of the computational devices that respectively provide: (1) valuations for patented intellectual properties and (2) investment criteria database and evaluation of an enterprise's pre-existing financial condition.
Figure 2:
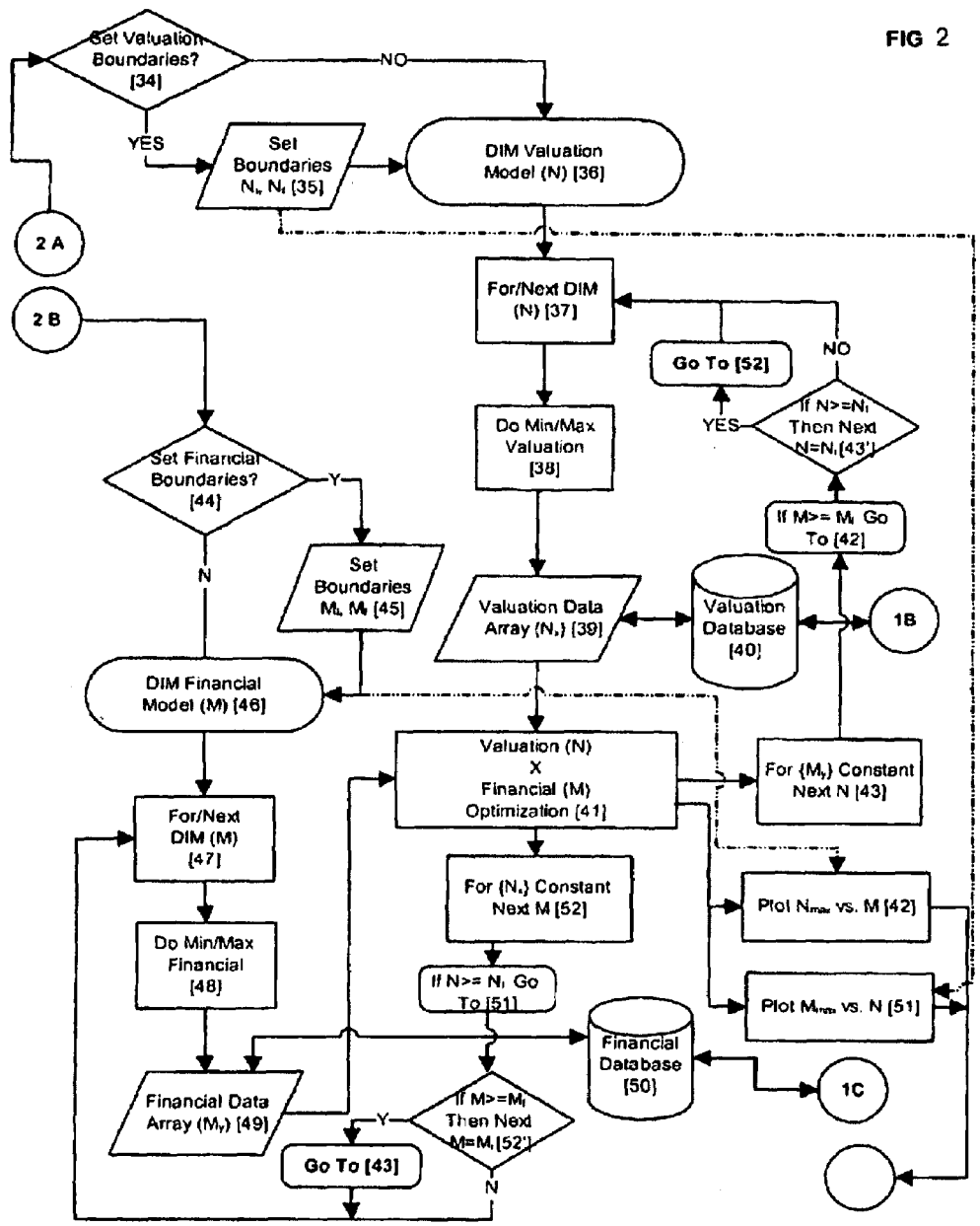
FIG. 2 is a continuation of FIG. 1's flowchart view of the computational devices which further provide for optimization and selection of transaction parameters following from the valuation investment criteria portions of the flowcharts.
Figure 3:
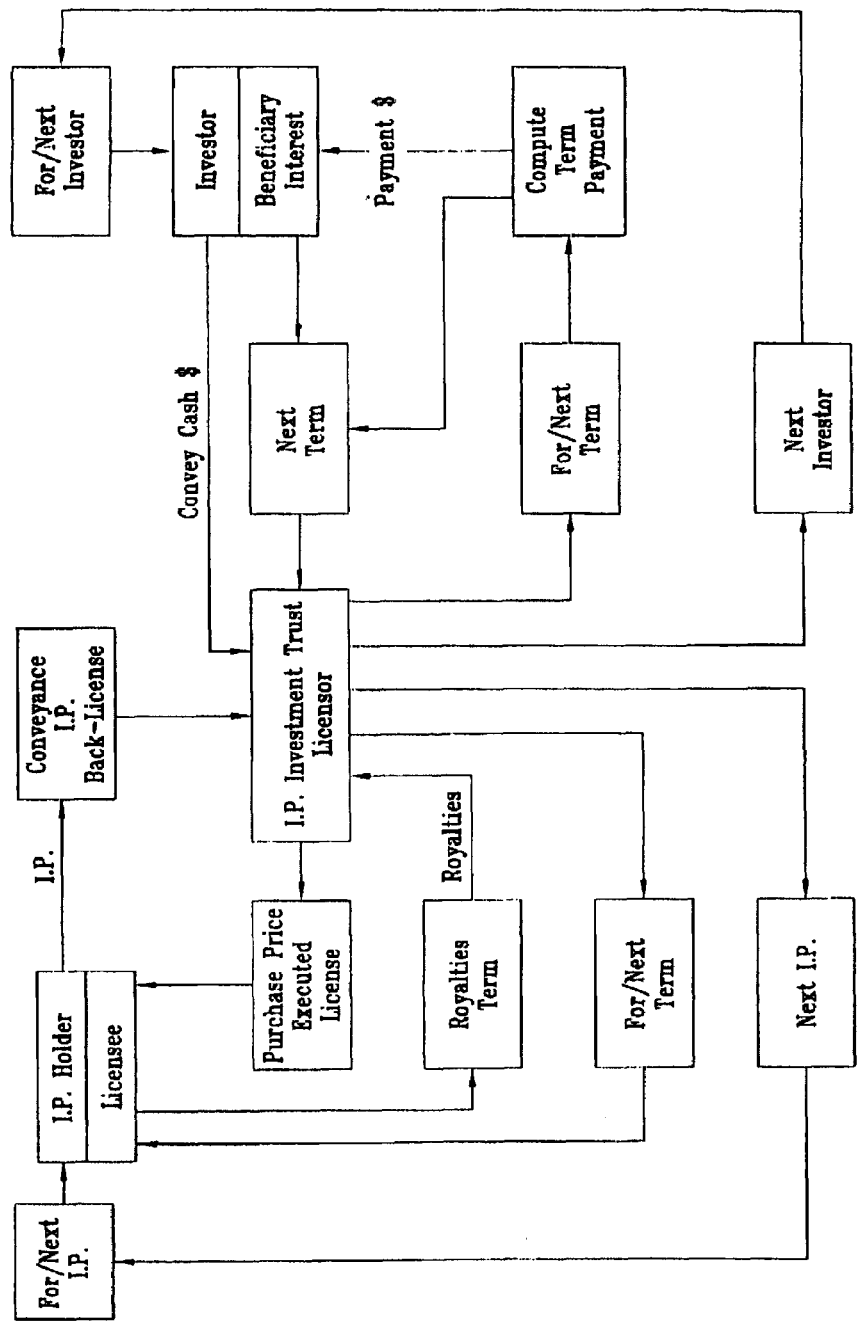
FIG. 3 is a general flowchart view of the formation of an investment entity for the pooling of investment capital, acquisition of patent estates, collection of revenues and distribution funds, revenues, proceeds and interests amongst parties of the investment entity.

A preferred embodiment of the invention for securitization of patents is illustrated in FIGS. 1, 2 and 3 as follows:
1. In FIG. 1 at 1A, Patent Holder [1] inputs into Computer Program [7] a Patent [2] available for valuation and securitization.
2. Patent Data [3–6] is accessed from patent documents or data transmitted electronically (facsimile or internet access among other methods) including but not limited to; patent number, date of issue, claims, citations, inventors, assignees, and cross references and entered into Computer Program [7].
3. Computer Program [7] prompts the program user at decision point [8] to declare ownership status of Patent [2]. A negative input at [8] prompts decision point [9] to determine assumption of legal liabilities by Holder [1] pursuant to a securitization of Patent [2]. A negative input at [9] terminates the processing of Patent [2] by Program [7] and prompts the user for a new Patent [2'] at decision input [10] from Holder [1] into Program [7]. A negative input at [10] prompts user to enter a new Patent Holder [1'] at 1A on FIG. 1.
4. A positive response at [8] or [9] prompts Performance Data sub program [11] to engage a plurality of decision points [12–14] to select utility of Patent [2] to Holder [1]. Decision points [12–14] determine whether Patent [2] constitutes an invention or improvement of a product, process, or compliance of a product or process to regulatory standards, among other factors. An affirmative input at a particular decision point [12–14] engages an algorithm with a function scalar ≠0 within sub program [15] of Program [7]. The algorithm may derive from a database of applicable algorithms for a particular decision point [12–14]. A negative input to all decisions points exits sub program [11] and prompts decision point [10].
5. Sub-program [15] prompts the user to input accounting and business data at inputs [16–19] that relate to Patent [2]. Such inputs may include, without limitation: [16] historical and current accounting data related to revenues, direct and indirect costs, balance sheets, and associated cash flows; [17] forecasts of future accounting data; [18] risk algorithms applicable to [17]; and [19] R&D and continuing development costs for Patent [2].
6. Sub-program [15] performs a computational analysis which compares data inputs from [16–19] to data computed from assuming non-existence of Patent [2].
7. A decision point [20] performs a difference analysis of the output of Steps 5 and 6 previous to determine Patent [2] marginal value. For marginal value >0 sub-program [15] inputs Patent [2] data to sub-program [21] to perform valuation modeling. For marginal value ≦0 the program prompts [10].
8. The prompt of sub-program [21] concurrently prompts inputs [22–25] relating (without limitation) to the proprietary life and uncertainty risks associated with Patent [2]. Inputs [22–25] consist without limitation; [22] economic life; [23] legal life (may include input of [4]); [24] technology risk obsolescence (may include inputs [5,6] and selection of algorithm contained within database [40]); and [25] valuation risk comprising selection of algorithms in database [40] or direct input. Sub-program [21] compares inputs [22–25] to valuation data array database [40] at 1B which comprises accumulative data on a plurality of patents from a plurality of holders.
9. Sub-program [21] performs a series of patent valuation optimization computations [26] detailed at 2A on FIG 2.
10. Holder's [1] input of Holder's financial description [27] into Program [28] on FIG. 1 may constitute a separate program or a linked program to Program [7]. The program link occurs at [20] where marginal value>0 and inputs to decision point [29] to characterize a transaction as "on" or "off" balance sheet. "On" balance sheet transactions prompt sub program [30] to compute algorithms for patent [2] valuations based on changes made to balance sheets. "Off" balance sheet transactions input data at outputs [20] and/or [28] directly into financial model sub-program [31].
11. Sub-program [31] receives inputs alternatively from decision point [29], sub-program [30] or database [50] at 1C. Database [50] may receive and accumulate Investor investment parameters [32] at 1D on FIG. 1. Sub-program [31] uses computational algorithms to initialize financial optimizations at [33] and detailed at 2B on FIG. 2.
12. Output from [31] is accumulated in database [50] for future reference, and standardization and normalization of financial computations.
13. The Valuation scenario sub-program at [26] connects at 2A on FIG. 2. At [34], the user is prompted by a decision point to set valuation boundary conditions.

The valuation boundary conditions may include, without limitation, alternative inputs to inputs [16–19, 22–25]. An affirmative response at [34] prompts input [35] for boundary conditions $\{N_i\}$ and $\{N_f\}$ for various alternative inputs.

14. Inputs at [35] initialize sub-program [36] which dimensions Valuation Model $\{N_x\}$. A negative response at [34] directly inputs outputs at [26] in sub-program [36].

15. Valuation Model sub-program [36] enters a subroutine [37] which performs a "do loop" maximum/minimum iteration sub-program [38] for each $\{N_x\}$. The output at [38] queues Valuation Data array [39] and inserts and/or compares data output to Valuation Data Base [40] at 1B on FIGS. 1 and 2 respectively.

16. An optimization of Valuation Model $\{N\}$ and Financial Optimization $\{M\}$ is performed at sub program [41]. Such optimization methods may include without limitation, maximization of the determinant of the cross product of $\{N\}$ and $\{M\}$ or topological analysis. Output is held at [42] in storage pending next selection of $\{N\}$ boundary conditions at [43] which enters subroutine [37].

17. The Financial scenario sub-program at [33] connects at 2B on FIG. 2. At [44] the user is prompted by a decision point to set financial boundary conditions. The financial boundary conditions include, without limitation, financial performance conditions such as net present value, discounted cash flow, minimum or maximum investment increments. An affirmative response at [44] prompts input at [45] to set financial boundary conditions $\{M_i\}$ and $\{M_f\}$.

18. inputs at [45] initialize sub-program [46] which dimensions Financial Model $\{M_x\}$. A negative response at [44] directly inputs outputs at [33] in sub-program [46].

19. Financial Model sub-program [46] enters a subroutine [47] which performs a "do loop" maximum/minimum iteration sub-program [48] for each $\{M_x\}$. The output at [48] queues Financial Data Array [49] and inserts and/or compares data output to Valuation Data Base [50] at 1B on FIGS. 1 and 2 respectively.

20. An optimization of Valuation Model $\{N\}$ and Financial Optimization $\{M\}$ is performed at sub-program [41]. Such optimization methods may include without limitation, maximization of the determinant of the cross product of $\{N\}$ and $\{M\}$ or topological analysis. Output is held at [51] in storage pending next selection of $\{M\}$ boundary conditions at [52] which enters subroutine [47].

21. A plot and/or sort of data held at [42] identifies ($\{N_{Max}\}$ vs. M).

22. A plot and/or sort of data held at [51] identifies ($\{M_{Max}\}$ vs. N).

23. At decision point [53] the intersection of $\{$Plot $N_{Max}\}$ determined at [42] with $\{$Plot $M_{Max}\}$ determined at [51] $\{$Plot $N_{Max} \cap$ Plot $M_{Max}\}$ is evaluated. An intersection resulting in a Null set is deemed negative which prompts decision point [54]. An intersection ≠Null set is deemed affirmative and prompts selection of M and N at [55].

SPECIFIC EXAMPLE

Example 1-A
Monetization of a Patent

Company T decides to monetize a patent it owns which is identified as Patent A. Patent A is a U.S. patent which covers the composition of matter of a pharmaceutical substance α which is used in the treatment of a human health disorder H. The following information is known about Patent A, product α, and the marketplace for health disorder H:

(a) The unexpired life of Patent A is 10 years=AG23=RPL.
(b) Company T is the assignee of the entire interest in Patent A.
(c) There are no legal actions pending against Company T with respects to the validity or enforceability of Patent A.
(d) Company T spent $1,000,000=AG21=IF(IREV>0, AG21=0,AG21) to research and develop the technology covered by Patent A which Company T expensed in the years in which the research was conducted.
(e) The sales of product α are $25 million per year=IREV in the United States. The economic life of α, absent foreseeable technological replacements, will significantly exceed 10 years.
(f) Sales of product α have grown steadily at 10% per year=RVGR=IF((11/*G1−IREV)/G1<RVGR, RVGR=H1,RVGR) in the previous five years.
(g) The value of all products and services currently used to treat disorder H in the U.S. is $30 million per year.=G1
(h) The incidence of H is increasing 3% per year=H1 in the U.S.
(i) Approximately 90%=I1 of persons suffering from H respond favorably to treatment by α which is also the lowest cost form of treatment for H.
(j) The materials, manufacturing overhead, sales, administrative and continuing R&D costs associated with α as a percent of sales revenues:

| | | |
|---|---|---|
| Sales Revenues | 100% | |
| Materials | .20% | = MTL |
| Manufacturing Overhead | 10% | = MFGOH |
| Gross Margin | 70% | |
| Sales | 15% | = SALESEXP |
| Administration | 10% | = ADMN |
| Continuing R&D | 5% | = R&DEXP |
| Operating Margin | 40% | |

(k) Company T is taxed at the rate of 35%=XTAXRATE=XCGR for ordinary income and capital gains income respectively. For simplicity in this example, the rates are assumed to be the same.
(l) The financial method of analysis used by Company T are return on equity ("ROE") and net present value ("NPV"). The ROE for T is 15% per year=XROE and the NPV discount factor is 6% per year=XNPVDF.
(m) For purposes of this Example, inflation and changes in manufacturing cost are both respectively set at 0% per year=XINFLRATE for the unexpired life of Patent A.
(n) Compound α expresses useful biological activity suitable for animal health applications. For purposes of this Example, the contingent economic benefit that could result from application of α to animal health markets is discounted to zero.

In Example 1-A, a first valuation algorithm is employed using inputs disclosed in (a)–(k) and (m) to determine the remaining value of Patent A to Company T. The preferred first valuation algorithm is more particularly described in "Preferred Embodiment of the Invention". The first valuation algorithm determines that existing business activity obviates the application of prior R&D expenditures recited in (d) to the computation of value for A.

The sales growth portion of the algorithm for compound α modifies the historical growth recited in (f) to account for the market limits for H recited in (g) and (h) and the available portion of market H to compound α which is recited in (i).

The first valuation algorithm determines apportionment of Patent A value in each subsequent accounting period as a fraction of the operating margin or gross margin respectively depending on the specific utility of A and the dependent requirements of business functions other than A to sustain the sales of α.

With respect to R&D, the first valuation algorithm takes into account whether such expenditures constitute a continuing technical maintenance cost required for sales of α or whether such expenditures relate to investments in new technology development unrelated to the current market and sales of α.

For a Patent A having all the technical characteristics previously recited, and for a market H, product α and Company T having the business characteristics previously recited, the gross monetization value of Patent A with respects to its unexpired patent life can be reasonably computed to be $50.87 million.

The specific computations and algorithms utilized to determine the gross monetization value of Patent A above are recited below:

(1) Calculation of Book Value of business in which Patent A is employed:

Net Profit For Year $N=(IREV*(1+RVGR)^{(N-1)}-IREV*(MTL+MFGOH+SALESEXP+ADMN+R\&D)*(1+XINFLRATE)^{(N-1)})*(1-XTAXRATE)/(1+XNPVDF)^{(N-1)}=NP(N)$ By making the numerical substitutions set forth above, the numerical results are:

| For | IREV | = | $25.0 | (Millions/Year) |
|---|---|---|---|---|
| | RVGR | = | 3.0% | (Annual Growth) |
| | MTL | = | 20% | (Material Cost as % Sales) |
| | MFGOH | = | 10% | (Manufacturing Overhead as % Sales) |
| | SALESEXP | = | 15% | (Sales Cost as % Sales) |
| | ADMN | = | 10% | (Administration as % Sales) |
| | R&DEXP | = | 5% | (Continuing R&D on α as % Sales) |
| | XINFLRATE | = | 0% | (Inflation %/year) |
| | XTAXRATE | = | 35% | (Ordinary Income Tax Rate % Taxable Business Income/year) |
| | XNPVDF | = | 6% | (Discount Factor, %/year |

(i) The resulting outputs are:

| | N (Year) | | | | | | | | | |
|---|---|---|---|---|---|---|---|---|---|---|
| | 1 | 2 | 3 | 4 | 5 | 6 | 7 | 8 | 9 | 10 |
| NP(N)(Mil $) | $6.5 | $6.6 | $6.7 | $6.7 | $6.8 | $6.8 | $6.8 | $6.8 | $6.8 | $6.8 |

(ii) Book Value=Adjustment to Net Profit for NPV and ROE=((FOR N=1,N=RPL−1), (XBPROE*NP(N))/XBPNPVDF+NP (N+1): (XBPROE*NP(RPL−1))/XBPNPVDF+NP(RPL)=BOOK
where XBPROE=1+XROE and
XBPNPVDF=1+XNPVDF By making the numerical substitutions set forth in Example 1-A, the numerical results are:

| For | XROE | = | 15% | (Return on Equity %/year) |
|---|---|---|---|---|
| | XBPROE | = | 1.15 | |
| | XNPVDF | = | 6% | (Net Present Value Discount %/year) |
| | XBPNPVDF | = | 1.06 | and |

| | N (Year) | | | | | | | | | |
|---|---|---|---|---|---|---|---|---|---|---|
| | 1 | 2 | 3 | 4 | 5 | 6 | 7 | 8 | 9 | 10 |
| NP(N)(Mil $) | $6.5 | $6.6 | $6.7 | $6.7 | $6.8 | $6.8 | $6.8 | $6.8 | $6.8 | $6.8 |

The resulting output is BOOK=$99.37 million.

The output variable BOOK reflects the expected increase in business value for Company T that results solely from the profits and assumed re-investment of profits derived from the sale and manufacture of α during the remaining patent life of "A". Such calculations are recognized as useful measures of future business value.

(2) Calculation of Fractional Business Value and Present Value Attributable to Patent A Technology:

(i) Technology Fraction=XMFGSAV*XMFGCOST+ LNWPR*(1−XMFGCOST−SALESEXP)* (ADMN+R&DEXP)/(SALESEXP+ADMN+ R&DEXP)+LREG*(1−(XMFGCOST+

SALESEXP+ADMN+R&DEXP−XREGCOST))
*R&DEXP/(XREGCOST+R&DEXP)=
TECHFRAC where XMFGSAV=Manufacturing Savings %=0 LNWPR=IF(New Product, 1,0)=1 LREG=IF(Required by Regulation,1,0)=0 XREGCOST= Regulatory Costs %=0 XMFGCOST=MTL+MFG OH=Manufacturing Costs=30%

By making the additional numerical substitutions set forth above, the numerical results are:

| For | SALESEXP | = | 15% | (Sales Cost as % Sales) |
|---|---|---|---|---|
| | ADMN | = | 10% | (Administration as % Sales) |
| | R&DEXP | = | 5% | (Continuing R&D on α as % Sales) |

The resulting output is TECHFRAC=0.275=27.5%.

The output variable TECHFRAC is an empirical coefficient which can be employed in a successive algorithm to attribute a cash value that is contributed by a technology to a business in a discrete time period. The TECHFRAC algorithm reflects the fractional contribution that technology makes to the total value of a business which may be compared to fractional values contributed by other business functions. Such calculations represent an improvement over prior efforts to estimate technology value as either all or none of the profits of a business. The TECHFRAC algorithm anticipates that useful technologies have discrete and distinguishable means for contributing value as a function of the technological novelty.

(i) Technology Present Value=SUM
((TECHFRAC*IREV*(1+RVGR)^(N−1)−
R&DEXP*IREV*(1+XINFLRATE)^(N−1))/XBPN-
PVDF^(N−1):(TECHFRAC*IREV*(1+RVGR)^(RPL−
1)−R&DEXP*IREV*(1+XINFLRATE)^(RPL−1))/
XBPNPVDF ^(RPL−1))=TECHVALUE By making the numerical substitutions set forth above, the numerical results are:

| For | IREV | = | $25.0 | (Millions/Year) |
|---|---|---|---|---|
| | RVGR | = | 3.0% | (Annual Growth) |
| | R&DEXP | = | 5% | (Continuing R&D on α as % Sales) |
| | XINFLRATE | = | 0% | (Inflation %/year) |
| | N | = | | Years 1 to RPL |
| | RPL | = | | 10 Years |
| | XBPNPVDF | = | 1.06 | Net Present Value Discount |
| | TECHFRAC | = | 27.5% | |

The resulting output is TECHVALUE=$50.87 Million.

The output variable TECHVALUE is a current valuation of Patent A as a property asset whose value is the sum of its income contribution due to its technological novelty over its unexpired patent life and divided by a net present value denominator for future expected income. Income contribution computed by multiplying TECHFRAC and future expected annual sales is reduced to the extent future R&D expenditures are made to maintain the utility of Patent A. The TECHVALUE algorithm is a novel and useful method to determine the internal value of an intellectual property to a business that owns and utilizes such an intellectual property. TECHVALUE is novel in that it creates a computed economic value that a prospective purchaser of such a technology may utilize to determine whether such a purchase price is supported by the business currently using it. A further novelty is that TECHVALUE does not require a pre-existing market for technologies similar to Patent A to compute a value that reasonably represents a maximum appraisal value that is supportable by the business presently using Patent A.

Such monetization computed by the enumerated algorithms set forth in this Example 1 does not preclude the computation of alternative values as a result of alternative inputs in (a)–(n). Further, the computation does not preclude the use of the algorithms to compute the reasonable fair value that can be attributed to various contingent applications of A for businesses not yet in existence but foreseeable prior to the unexpired life of A. The computation does not preclude the use of statistical variations or processes to manipulate the inputs into the valuation algorithms or statistical manipulation of such outputs to express the reasonable range of the value of A.

It will be obvious that such variations will compute a bounded range for the value of A whose maximum and minimum values will constitute the most likely monetization values of A which result in the least variance of the solution set of all such monetization values.

The more realistically that Patent A's present value can be estimated, the less risk is involved in the creation of a monetized financial derivative. Having a reasonably predictable risk is essential to having a viable marketplace for the securitization of patents. In the current embodiment, the derivative is structured as a purchase money instrument which pays a fixed royalty at regular intervals over the remaining life of Patent A in exchange for a license to Company T to practice A. Computation of a fixed royalty stream can be accomplished with well known algorithms for determining the required payment to return a predetermined rate of return given an initial principal amount.

(3) Annual Royalty payments on Patent A:
(i) Annual Royalty=PMT(XRAR,RPL,−TECH-
VALUE)=ROYALTY
where XRAR=Royalty Annuity Rate %/year=7.0%
PMT( )=Annuity Computation Function By making the additional numerical substitutions set forth in Example 1-A, the numerical results are:

| For | XRAR | = | 7.0% | (Royalty Annuity %/year) |
|---|---|---|---|---|
| | RPL | = | | 10 Years |
| | TECHVALUE | = | $50.87 | Million |

The resulting output is ROYALTY=$7.24 Million/year.

The selection of values for XRAR (royalty annuity rate) may be arbitrary or may be selected so that the present value of current and future income of Company T where Patent A is sold and back-licensed equals or exceeds the present book value of the business income of Company T over the life of Patent A. While such algorithms such as Eq. (3)(i) constitute prior art in the computation of annuity or debt and principal calculations for pre-existing financial instruments it is novel and useful to create the algorithm of Eq. (3)(i) that integrates the TECHVALUE algorithm to apply Eq. (3)(i) algorithms to intellectual property.

The computations to determine if Company T obtains an increase in present book value if it securitizes Patent A are:

(4) Net Present Value of Patent A Sale proceeds over remaining Patent life:

(i) NPV Patent=(1−XCGR+LDCG*XCGR)*XFees*(XBPROE)^RPL/XBPNPVDF^(RPL)=PATENT $

| For: | LDCG | = | Defer capital gains? (Y = 1 , N = 0) = 0 |
|---|---|---|---|
| | XCGR | = | 35% (Capital Gains Tax Rate) |
| | XFees | = | TECHVALUE*(1 − Fees%) = TECHVALUE |
| | Fees% | = | 0 (Business Expenses for Transaction, %/TECHVALUE) |
| | XBPROE | = | 1.15 (Return on Equity Multiplier) |
| | XBPNPVDF | = | 1.06 (Net Present Value Discount Divisor) |
| | RPL | = | 10 |

The resulting output is PATENT$=$74.70 Million.

(ii) Profits−License Royalties For Year N=(IREV*(1+RVGR)^(N−1)−(IREV*(MTL+MFGOH+SALESEXP+ADMN+R&DEXP))*(1+XINFLRATE)^(N−1)−ROYALTY)*(1−XTAXRATE)/(1+XNPVDF)^(N−1)=NEWNET (N)

| For: | IREV | = | $25.0 Million (First Year Sales) |
|---|---|---|---|
| | RVGR | = | 3% (Sales Growth %/year) |
| | N | = | 1 to RPL (Years of Unexpired Patent life) |
| | RPL | = | 10 years (Remaining Legal Life of Patent A) |
| | MTL | = | 20% (Material Cost as % Sales) |
| | MFGOH | = | 10% (Manufacturing Overhead as % Sales) |
| | SALESEXP | = | 15% (Sales Cost as % Sales) |
| | ADMN | = | 10% (Administration as % Sales) |
| | R&DEXP | = | 5% (Continuing R&D on α as % Sales) |
| | XINFLRATE | = | 0% (Inflation %/year) |
| | XNPVDF | = | 6% (Net Present Value Discount %/yr) |
| | XTAXRATE | = | 35% (Ordinary Income Tax Rate %) |
| | ROYALTY | = | $7.24 Million (Annual Royalty) |

The resulting output NEWNET(N) for years N=1 to 10 years is:

| N(Year) | 1 | 2 | 3 | 4 | 5 | 6 | 7 | 8 | 9 | 10 |
|---|---|---|---|---|---|---|---|---|---|---|
| NEWNET(N)(Mil $) | $1.8 | $2.2 | $2.5 | $2.8 | $3.0 | $3.3 | $3.5 | $3.7 | $3.8 | $4.0 |

(iii) New Book Value=NPV and ROE Adjustments to Sum of NEWNET(N)=((FOR N=1,N=RPL−1), (XBPROE*NEWNET (N)/XBPNPVDF+NEWNET (N+1)):(XBPROE*NEWNET (RPL−1)/XBPNPVDF+NEWNET (RPL))+PATENT $=NEWBOOK

| For: | XBPROE | = | 1.15 (Return on Equity Multiplier) |
|---|---|---|---|
| | XBPNPVDF | = | 1.06 (Net Present Value Divisor) |
| | RPL | = | 10 years (Unexpired Patent Life) and |

| | N (Year) | | | | | | | | | |
|---|---|---|---|---|---|---|---|---|---|---|
| | 1 | 2 | 3 | 4 | 5 | 6 | 7 | 8 | 9 | 10 |
| NEWNET(N)(Mil $) | $1.8 | $2.2 | $2.5 | $2.8 | $3.0 | $3.3 | $3.5 | $3.7 | $3.8 | $4.0 |

The resulting output is NEWBOOK=$117.49 Million.

(iv) Change in Book Value=NEWBOOK−BOOK=VALUECHANGE

| For: | NEWBOOK | = | $117.49 Million |
|---|---|---|---|
| | BOOK | = | $99.37 Million |

The resulting output is CHANGEVALUE=$18.12 Million

The foregoing algorithms permit Company T to compare the difference between BOOK and NEWBOOK. If CHANGEVALUE>0, it is to Company T's advantage to sell and back license Patent A. The algorithms also permit Company T to determine any interim CHANGEVALUE(N) between NEWBOOK(N) and BOOK(N) by substituting any year N for the variable RPL where $1 \leq N \leq RPL$.

I claim:

1. An electronic data processing method of determining a change in value to an owner of a patent estate having at least one patent comprising:
   entering information related to the patent estate;
   calculating a present value of the patent estate using a first computerized valuation algorithm;
   selecting a second computerized valuation algorithm having a plurality of inputs;
   inputting the value of the patent estate into the second valuation algorithm;
   inputting at least one additional piece of information reflecting the owner's patent estate as a security required by the second valuation algorithm; and
   calculating a future value to the owner of the patent estate using the second computerized valuation algorithm.

2. An electronic data processing method according to claim 1 wherein said patent estate further comprises more than one patent.

3. An electronic data processing method according to claim 1 further comprising:
   entering an identifier for each patent of the patent estate, which comprises entering the patent number.

4. An electronic data processing method according to claim 1 further comprising:
   entering an identifier indicative of a utility of each patent in the patent estate, which comprises selecting from a list comprising new product category, improvement on existing product, new process, improvement on existing process, and regulatory compliance.

5. An electronic data processing method according to claim 4 further comprising:

using said identifier indicative of a utility for selecting a first valuation algorithm from a plurality of valuation algorithms particular to the type of utility associated with each patent.

6. An electronic data processing method according to claim 1 wherein said step of entering information related to the patent estate comprises entering information on the financial characteristics of the owner.

7. An electronic data processing method according to claim 1 wherein said step of determining the present value to the owner of the patent estate using said first valuation algorithm, comprises determining the present value of the owner with each patent and without each patent.

* * * * *